Figure 1:
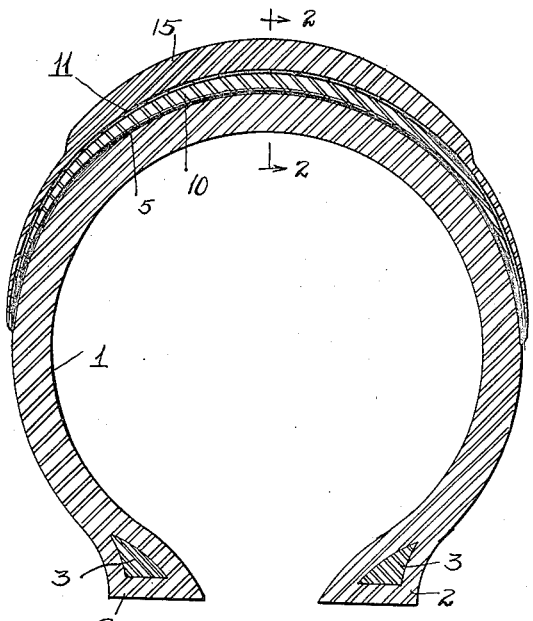

W. B. BURKE.
PROCESS OF MAKING TIRES.
APPLICATION FILED AUG. 20, 1919.

1,422,537.

Patented July 11, 1922.

INVENTOR
Wilbur B. Burke.
By Day, Oberlin & Day.
ATTORNEYS.

UNITED STATES PATENT OFFICE.

WILBUR B. BURKE, OF CLEVELAND, OHIO.

PROCESS OF MAKING TIRES.

1,422,537.  Specification of Letters Patent.  Patented July 11, 1922.

Application filed August 20, 1919. Serial No. 318,722.

*To all whom it may concern:*

Be it known that I, WILBUR B. BURKE, a citizen of the United States, and a resident of Cleveland, county of Cuyahoga, and State of Ohio, have invented a new and useful Improvement in Processes of Making Tires, of which the following is a specification, the principle of the invention being herein explained and the best mode in which I have contemplated applying that principle, so as to distinguish it from other inventions.

The present improvements constitute in a sense a development or adaptation of the method of vulcanizing rubber which forms the subject matter of U. S. Letters Patent No. 1,216,654, granted to me under date of February 20, 1917, to the manufacture of new tires, or, more specifically, tire casings. As described in said patent, my aforesaid method may be employed with equally satisfactory results in the manufacture of articles de novo, as in repairing worn tire shoes, the latter constituting the use specifically described in the specification of said patent.

In the manufacture of the larger and heavier sizes of tire casings, particularly of giant tires, such as are coming more and more into use for truck service, no small difficulty has been encountered in properly curing the extra thicknesses of material entering into the construction of such tires. In other words, the ordinary method of vulcanizing in a steam mold tends, to a considerably greater degree than in the manufacture of ordinary sizes of casings, to overcure the outer layer, if the interior is properly cured, or to leave the latter undercured if the outer layer is left just right. I have found, however, that by the incorporation of a vulcanizing element of the construction described in my aforesaid patent, adapted to be electrically heated, vulcanization can be effected from within a casing of the sort in question simultaneously with the application of steam heat in the usual way to the exterior. Not only am I thus able to secure a much more uniform heating and corresponding vulcanizing effect throughout the mass of the casing, but the entire operation of vulcanizing can be considerably accelerated, so that a much shorter time is required to complete the manufacture of such casings than by any known method.

To the accomplishment of the foregoing and related ends, the invention, then, consists of the steps hereinafter fully described and particularly pointed out in the claims, the annexed drawing and the following description setting forth in detail certain mechanism for carrying out the invention, such disclosed means constituting, however, but one of the several ways in which the principle of the invention may be used.

In said annexed drawing:—

Figure 3:
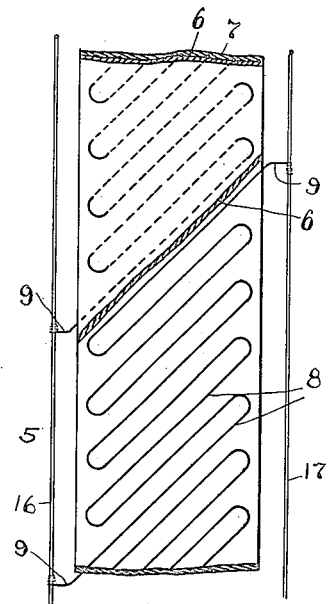
Figure 2:
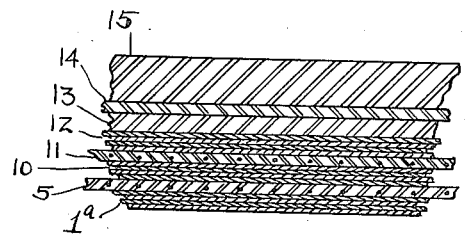
Figure 4:
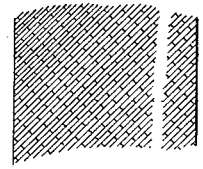
Figure 5:
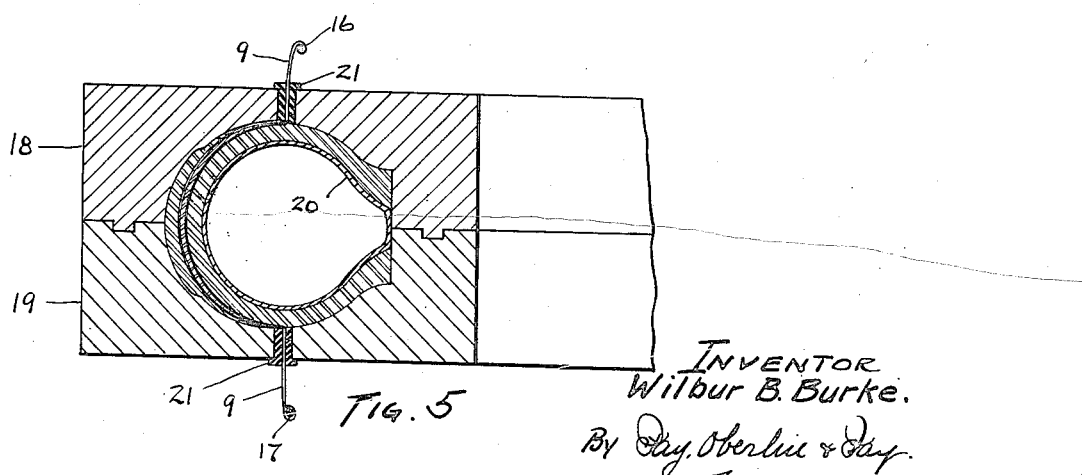

Fig. 1 is a cross-sectional view of a tire casing constructed in accordance with my present improved method; Fig. 2 is a longitudinal cross-section on a somewhat larger scale than that of Fig. 1, the plane of the section being indicated by the line 2—2, Fig. 1; Fig. 3 is a plan view of the improved vulcanizing element which I utilize in the manufacture and construction of such casing, a portion of such element being broken away to better illustrate its character; Fig. 4 is a section of tire fabric such as is regularly utilized in the manufacture of casings of the sort in hand; and Fig. 5 is a transverse section through a mold showing a casing in the course of being vulcanized in accordance with my present improved method.

The assembled casing, as shown in cross-section in Figs. 1 and 2, may be regarded either as the finished article or as the assembly preliminary to vulcanization. Such casing comprises as its base a succession of layers of preferably cord fabric of the kind shown in Fig. 4, superimposed one upon the other to form a body 1 of desired thickness. The edges 2 of the casing are reinforced by bundles of longitudinally extending wires 3 or other equivalent inextensible members, and such edges may be either straight-sided as shown, or formed for engagement with clencher rims, as desired. The cord fabric may be in any number of plies, three or four ply fabric being ordinarily used, and a layer of fresh rubber is interposed between successive layers of fabric, as usual. In Fig. 2 it will be observed that only one such layer 1ª of fabric is shown at the bottom or inner edge of the section, whereas in the completely assembled tire three or four such layers, superimposed on each other, will form the base or body 1.

In order to build up the tread portion of the casing, I first place on the outer face of the body 1 a vulcanizing element 5 of the kind illustrated in Fig. 3, where such element is shown as composed of two relatively thin layers 6 and 7 of fresh, i. e. unvulcanized, rubber, which are laid one upon the other in close contact while in the condition stated, the result being that such layers stick together or coalesce so as to form in effect a single integral layer. Previously, however, to thus bringing such layers 6 and 7 into contact with each other, an electric resistance element, in the form of a fine wire 8, is disposed between the same, such wire being preferably bent back and forth in the fashion shown in the figure in question, and simultaneously laid on the exposed face of the one sheet, so as to present a series of closely assembled parallel reverse loops that lie at an acute angle (approximately 45° as shown) to the median line of the sheet. After all the wire has been thus laid along the entire extent of the sheet of rubber, it is severed at intervals, preferably at a point intermediate between two adjacent loops, and the separate ends 9 bent outwardly to lie clear of the sheet, whereupon the other layer 7 is applied, with the result that the loops lying between the edges of the first mentioned sheet are firmly embedded in the resultant composite layer.

I then superimpose another layer 10 of so-called cord fabric, which is composed of one or more plies as desired, and has its edges feathered or beveled. Next a second element 11 of the same form and construction as element 5 is added, followed in succession by a layer 12 of fabric similar to layer 10, a cushion 13, a breaker strip 14, and finally a tread 15. Such cushion and breaker strip constitute in themselves familiar features of casing construction, as need not be explained. It will also be understood that the body 1 as well as the tread 15 as usual, particularly in the manufacture of larger casings, will probably be partially vulcanized preliminarily to the further process of manufacture herein involved.

When the complete casing has been thus assembled, the ends 9 of the wire 8 in the special vulcanizing elements 5 and 11 are electrically connected together along opposite edges of said elements, as by being attached to larger conductors 16 and 17 (see Fig. 3). Upon then properly connecting such conductors with a suitable source of electricity, a like current will be caused to flow through each of the sections into which the wire 9 is subdivided in the layers or elements 5 and 11 respectively, since all of these sections of wire contain the same number of loops and are connected in parallel across said conductors. However, in order to cure or finish the curing, i. e. vulcanization, of the body 1 and tread portion 15 of the casing, steam or equivalent heat requires to be in the stage of manufacture previously referred to, in a sectional mold as shown in Fig. 5, such mold being of annular form, divided into two parts 18 and 19 on a central horizontal plane. It will be understood that the mold, or the series of molds, such as shown in said figure, are supported in a suitable drum or chamber (not shown) to which steam under pressure, and at any desired temperature, is admitted. The interior faces of the mold parts are hollowed out of course to fit the particular tire casing, which latter is placed in the cavity thus provided, and an air bag 20, which is the equivalent of an inner tube, inserted in order to maintain the casing in close fitting contact with the mold parts. The conductors 16 and 17 previously referred to are most conveniently carried outside of these mold parts as shown in Fig. 5, the wires 9 extending through insulators 21 in the mold parts. It is of course a matter of indifference how the electrical connections be made with the sections of wire 8 that constitute the heating element proper in the vulcanizing layers 5 and 11.

The process in hand, it will accordingly be observed, consists in applying heat to the interior of the composite casing through the medium of the electric heating means just described, at the same time that heat is applied to the exterior of said casing through the mold parts 18 and 19 from a surrounding heating medium such as steam. The vulcanization of the several layers composing the casing will thus proceed at an equal rate, and may be speeded up, since there will be no danger of overcuring one part before another has become properly vulcanized. This acceleration of the operation obviously will materially reduce the cost of manufacture by cutting down the time that the material is in process, and increasing the capacity of the apparatus.

It will of course be understood that while I have described my improved process as particularly applied to the manufacture of tire casings, such process may be employed with equal advantage in the vulcanizing of other rubber articles composed of several layers, whatever the character of use of such article may be.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of making tire casings, the steps which consist in assembling the composite layers of the casing in proper order, interposing a vulcanizing element adapted to be electrically heated, and then simultaneously applying heat exteriorly to such casing and passing a heating electric current through said element.

2. In a method of making tire casings, the steps which consist in assembling the composite layers of the casing in proper order, interposing a vulcanizing element adapted to be electrically heated, and then simultaneously applying steam heat exteriorly to such casing and passing a heating electric current through said element.

3. The method of vulcanizing a tire casing or like article, which consists in simultaneously applying heat exteriorly and of such article and within the body of material composing the same.

4. The method of vulcanizing a tire casing or like article, made up of a plurality of plies or layers, which consists in simultaneously applying heat exteriorly to such article and electrically generating heat within one or more of such plies or layers.

Signed by me, this 18th day of August, 1919.

WILBUR B. BURKE.